(12) United States Patent
Marks

(10) Patent No.: US 11,081,021 B2
(45) Date of Patent: Aug. 3, 2021

(54) PRACTICE BOW TIE ARTICLE, KIT, AND METHOD

(71) Applicant: Steven Marks, Cuyahoga Falls, OH (US)

(72) Inventor: Steven Marks, Cuyahoga Falls, OH (US)

( * ) Notice: Subject to any disclaimer, the term of this patent is extended or adjusted under 35 U.S.C. 154(b) by 405 days.

(21) Appl. No.: 15/983,480

(22) Filed: May 18, 2018

(65) Prior Publication Data

US 2018/0336799 A1 Nov. 22, 2018

Related U.S. Application Data

(60) Provisional application No. 62/508,541, filed on May 19, 2017.

(51) Int. Cl.
| | | |
|---|---|---|
| *G09B 19/00* | (2006.01) | |
| *A41D 25/00* | (2006.01) | |
| *G09B 1/32* | (2006.01) | |
| *A41D 25/08* | (2006.01) | |

(52) U.S. Cl.
CPC ......... *G09B 19/0076* (2013.01); *A41D 25/00* (2013.01); *A41D 25/08* (2013.01); *G09B 1/32* (2013.01); *G09B 19/003* (2013.01)

(58) Field of Classification Search
CPC ............................ G09B 19/00; G09B 19/0076
USPC ..... 434/247, 258, 260; 2/144, 148, 151, 154
See application file for complete search history.

(56) References Cited

U.S. PATENT DOCUMENTS

| | | | | |
|---|---|---|---|---|
| 2,735,098 | A | | 2/1956 | Gindi |
| 2,944,886 | A | | 7/1960 | Fisher et al. |
| 3,271,780 | A | | 9/1966 | De Jean |
| 3,321,773 | A | | 5/1967 | Orciuch |
| 3,335,426 | A | * | 8/1967 | Light ..................... A41D 25/06 2/146 |
| 3,490,073 | A | | 1/1970 | Webster |
| 2,646,630 | A | | 3/1972 | Russell |
| 3,747,220 | A | * | 7/1973 | Weisnicht .............. A41D 25/08 33/501 |
| 4,661,072 | A | * | 4/1987 | White .................... A63H 33/00 434/260 |
| 4,815,772 | A | * | 3/1989 | Lizarraga ............... A41D 25/08 2/153 |
| 5,088,118 | A | | 2/1992 | Whiteley |
| 5,249,967 | A | * | 10/1993 | O'Leary ............ A63B 24/0003 434/247 |
| 5,314,186 | A | * | 5/1994 | Lee .................... A63B 69/3667 434/252 |
| 5,505,002 | A | * | 4/1996 | Falco ..................... A41D 25/00 2/144 |
| 5,562,456 | A | * | 10/1996 | Cianciotto ............. A41D 25/08 289/17 |
| 5,562,457 | A | * | 10/1996 | Haslam ............. G09B 19/0076 24/713 |
| 5,745,918 | A | * | 5/1998 | Shukla ................... A41D 25/00 2/144 |

(Continued)

*Primary Examiner* — Kurt Fernstrom
(74) *Attorney, Agent, or Firm* — Emerson, Thomson & Bennett, LLC; Roger D. Emerson; Peter R. Detorre

(57) ABSTRACT

Provided are articles, kits, and methods for teaching a person how to tie a bow tie. A practice bow tie includes an elongated piece of flexible material with indicators on the front and rear surface of the bow tie. The indicators, also provided in a kit, define a portion, fold line, or step that aid a user in tying a bow tie to achieve a satisfactory appearance.

20 Claims, 9 Drawing Sheets

(56) References Cited

U.S. PATENT DOCUMENTS

| | | | | |
|---|---|---|---|---|
| 5,864,881 | A | * | 2/1999 | Simmons ............... A41D 25/08 |
| | | | | 2/144 |
| 6,015,172 | A | * | 1/2000 | Williams ............... A41D 25/08 |
| | | | | 223/DIG. 1 |
| 6,698,102 | B2 | | 3/2004 | Mangiapane et al. |
| 7,309,235 | B2 | * | 12/2007 | Wilk .................... A43B 1/0027 |
| | | | | 434/260 |
| 9,844,237 | B2 | * | 12/2017 | Cristodero ........... A41D 25/005 |
| 9,854,860 | B1 | * | 1/2018 | Katz ...................... A41D 25/08 |
| 10,123,579 | B2 | * | 11/2018 | Brunelle ................ A41D 25/08 |
| 2005/0064380 | A1 | * | 3/2005 | Ponder ............... G09B 19/0076 |
| | | | | 434/365 |
| 2014/0366243 | A1 | * | 12/2014 | Ontiveros ............... A41D 25/06 |
| | | | | 2/154 |
| 2016/0027326 | A1 | * | 1/2016 | Brown ............... G09B 19/0076 |
| | | | | 434/260 |

* cited by examiner

PRACTICE BOW TIE ARTICLE, KIT, AND METHOD

TECHNICAL FIELD

The present disclosure relates to neck garments. More particularly, the present disclosure is directed to a practice bow tie with indicator, a kit of instructional indicator labels to be removeably applied to any bow tie, and a method for teaching a user how to tie a bow tie with indicators to achieve a satisfactory bow tie appearance.

BACKGROUND

Bow ties have recently seen a resurgence in popularity as perhaps the neckwear no longer holds the stigma that they are worn purely by clowns, waiters, and college professors. Whatever the reason, it is general public opinion that bow ties are harder to tie than traditional four-in-hand neckties. As such, a person may be less inclined to purchase a bow tie.

Due to the perceived difficulty, many websites and online videos exist that offer instruction and attempt to teach a person how to properly tie a bow tie. One problem with this learning method is that it requires the person to look back and forth from the video instructions to the bow tie for each step and sometimes losing information in the transition. Often times, it is hard for a video or set of instructions to properly illustrate the best fold locations in order to achieve a satisfactory bow tie appearance and thus, a user may have to re-tie the bow tie, experimenting with varying manipulations, in order to achieve the desired satisfactory appearance.

While there are many garments that provide aid to a user tying a knot for traditional four-in-hand neck tie, see U.S. Pat. Nos. 3,490,073, 3,321,773, 2,994,886, 6,698,102, US Patent Publication No. 2005/0064380, and U.S. Pat. No. 3,271,780, the market and art is void of a practice garment and kit for teaching and aiding a user in tying the more complex bow tie. Generally, the four-in-hand tie is a series of wrapping and looping the garment about itself where the goal is to achieve a desired tie length. Tying a bow tie additionally includes multiple folding steps and rotations of the garment with a more challenging goal to achieve symmetry between both the left and right side as well as the front and back portions.

Furthermore, the market and art is void of a practice garment that provides graphical and/or instructional feedback to a person regarding whether or not the article is properly tied.

SUMMARY OF THE DISCLOSURE

Disclosed herein are bow ties, articles, indicator kits, and methods that teach a user how to tie a bow tie. A practice bow tie provides a training article for users to learn and practice the tying method. A kit includes removable indicators that temporarily converts any bow tie to a practice bow tie.

According to one aspect of the present disclosure, a practice bow tie is made of an elongated piece of flexible material. The bow tie has a front and rear surface, a first and second flared end, and a middle/neck portion. The neck portion is about the center the bow tie/elongated piece of flexible material. The bow tie also includes a first and second fold portion wherein each fold portion is located between a flared end of the bow tie and middle/neck portion. The practice bow tie includes a plurality of spaced indicators positioned on the front and rear surface of the bow tie. Each individual indicator indicates the bow tie's long end, fold locations, as well as the front and back left and right portions.

In accordance with another aspect of the present disclosure, the practice bow tie includes fold indicator lines. In accordance with some embodiments, a fold indicator line is printed, drawn, or inked, on the practice bow tie or flexible material. In accordance with other embodiments, an indicator line is a stitched line or string. In accordance with yet another aspect of the present disclosure, a fold line indicator is a flexible sticker or label that is fixed to the bow tie. In a further aspect of the disclosure, one indicator line is located on the front surface of a first fold portion of the bow tie and a second indicator line is located on the rear surface of the second fold portion.

In accordance with another aspect of the disclosure, fold line indicators are located approximately 3 to 5 inches in from each end of the bow tie.

In accordance with another aspect of the disclosure, indicators include sets of words. In some cases each label includes one of or both, a set of instructions readable to a person looking at a practice bow tie in a mirror and a set of instructions readable from the view of a person looking at the practice bow tie itself.

In accordance with another aspect of the disclosure, the bow tie length is adjustable. The bow tie is adjusted with an adjustable slider or a hook and loop assembly.

In accordance with another aspect of the disclosure, the indicators are printed directly on the flexible material. These indicators can be screen printed or printed by any other known means in the art.

In accordance with another aspect of the disclosure, the indicators are labels that are attached to the piece of flexible material. In some embodiments, the labels are flexible labels such that they may be manipulated along with the elongated flexible material of the bow tie.

In accordance with another aspect of the disclosure, indicators are located on the bow tie in specific locations. A long end indicator is located on the front surface about the second flared end, a first fold indicator is located on the front surface about the first fold portion and beyond approximately 3 to 5 inches from the first flared end, a front right indicator is located on the front surface about the first fold portion and located less than approximately 3 to 5 inches from said the flared end, a front left portion indicator is located on the front surface about the first flared end, a second fold indicator is located on the rear surface about the second fold portion and beyond approximately 3 to 5 inches from the second flared end, a back left portion indicator is located on the rear surface about the second fold portion and less than approximately 3 to 5 inches from the second flared end, a back right portion indicator is located on the rear surface about the second flared end.

In accordance with another aspect of the disclosure, the indicators/labels are placed on the practice bow tie such that the labels accommodate a left hand or right hand preference. Thus, the indicator positions are mirrored or reversed. For example, the long end indicator as discussed above, is originally located about the second flared end portion, in accordance with this aspect of the disclosure the long end indicator is instead located about the first flared end. Likewise, the first fold, front right, and front left indicators are placed on the second fold portion rather than on the first fold portion.

In accordance with another aspect of the disclosure, the practice bow tie contains colored portions such that when a person correctly ties the practice bow tie the bow tie appears to be a single uniform color. For example, a front section of the front surface of the bow tie, extending from a line between the first fold indicator and right front indicator to the first flared end, a second section, located on the rear surface of the bow tie extending from a line between the second fold indicator and aback left indicator to the second flared end, and an intermediate section, on the front surface of the bow tie between the second folding portion and center of the bow tie, are all the same color. In one exemplary embodiment each colored section is a yellow colored section. Thus, when the practice bow tie is tied, it will appear as a yellow bow tie to all observers.

In accordance with another aspect of the disclosure the plurality of spaced indicators are included among other design elements such that the plurality of spaced indicators are not obvious to a casual observer. In some embodiments the other design elements are dummy indicators.

In further aspects of the present disclosure, a kit is provided that includes a plurality of indicator labels designed to be attached on the front and rear surface of any bow tie. Each individual indicator label has a front surface and a rear surface. Each indicator label's front surface indicates to the person tying the bow tie one of, the bow tie's long end, first fold location, front right portion, front left portion, second fold location, back left portion, and back right portion.

Each individual indicator label's rear surface includes an attachment means. In accordance with one aspect of the disclosure, the attachment means creates a permanent attachment between an individual indicator label and a bow tie. In accordance with another aspect of the disclosure, the attachment means provides a removable attachment to a bow tie. In this case the labels are removable from the bow tie such that the removal does not damage, or only minimally damages, the bow tie. In some embodiments, the attachment means is a pressure sensitive adhesive. In some embodiments, the attachment means is a chemical bond. In other embodiments, the attachment means is a mechanical, like hook and loop, whereas the fabric of the bow tie provides locations for hooks of the attachment means to grab. In other embodiments, the attachment means is a thermoplastic adhesive, such as a hot melt.

In accordance with an aspect of the present disclosure, indicator labels from a kit are placed on a bow tie. A user places a long end indicator on the front surface about the second flared end, a first fold indicator on the front surface about the first fold portion and beyond approximately 3 to 5 inches from the first flared end, a front right indicator on the front surface about the first fold portion and located less than approximately 3 to 5 inches from said the flared end, a front left portion indicator on the front surface about the first flared end, a second fold indicator on the rear surface about the second fold portion and beyond approximately 3 to 5 inches from the second flared end, and a back left portion indicator on the rear surface about the second fold portion and less than approximately 3 to 5 inches from the second flared end.

In accordance with one aspect of the disclosure, each individual indicator label of the kit has a front surface that includes a set of words readable to a user looking in a mirror. In accordance with another aspect of the disclosure each individual indicator label of the kit has a front surface that includes a set of words readable from the view of a user reading tying the practice bow tie looking at the bow tie itself. In accordance with yet another aspect of the present disclosure each individual label includes both a set of words readable to a user looking in a mirror and a set of words readable from the view of a user reading tying the practice bow tie looking at the bow tie itself.

In another aspect of the present disclosure, a method is provided which includes the steps of (1) providing: an elongated piece of flexible material including a front surface and a rear surface, a first flared end and a second flared end; a neck portion, where the neck portion is about the center of the elongated piece of flexible material, a first fold portion and a second fold portion, wherein the fold portion is located between the first flared end and the neck portion and the second fold portion is located between the second flared end and the neck portion; and a plurality of spaced indicators positioned on the front surface and the rear surface, wherein the indicators indicate, a long end, a first fold location, a front right portion, a front left portion, a second fold location, a back left portion, and a back right portion.

The long end indicator is located on the front surface about the second flared end, the first fold indicator is located on the front surface about the first fold portion and beyond approximately 3 to 5 inches from the first flared end, the front right indicator is located on the front surface about the first fold portion and less than approximately 3 to 5 inches from the first flared end, the front left portion indicator is located on the front surface about the first flared end, the second fold indicator is located on the rear surface about the second fold portion and beyond approximately 3 to 5 inches from the second flared end, the back left portion indicator is located on the rear surface about the second fold portion and less than approximately 3 to 5 inches from the second flared end, the back right portion indicator is located on the rear surface about the second flared end.

The method further includes the steps of: (2) placing bow tie around a person's neck such that the flared end long end indicator extends downward beyond the second flared end which is also the short end; (3) crossing the bow tie's long end over the short end; (4) folding the first fold portion about a location between the first fold indicator and the front right indicator, a location that is approximately 3 to 5 inches from the first flared end; (5) rotating the first fold portion and first flared end sideways presenting the general shape of a bow tie creating the first bow tie shape comprising a center portion; (6) wrapping the long end down over the center of the first bow tie shape; (7) folding said first bow tie shape about the center portion; (8) folding the second fold portion about a location between the second fold indicator and back left indicator, a location approximately 3 to 5 inches from the second flared end creating a second bow tie shape; (9) threading the second bow tie shape through a loop created by wrapping the long end down over the center of the first shaped bow tie.

In some cases the method includes placing each individual indicator label on a bow tie.

DETAILED DESCRIPTION

Figure 1:
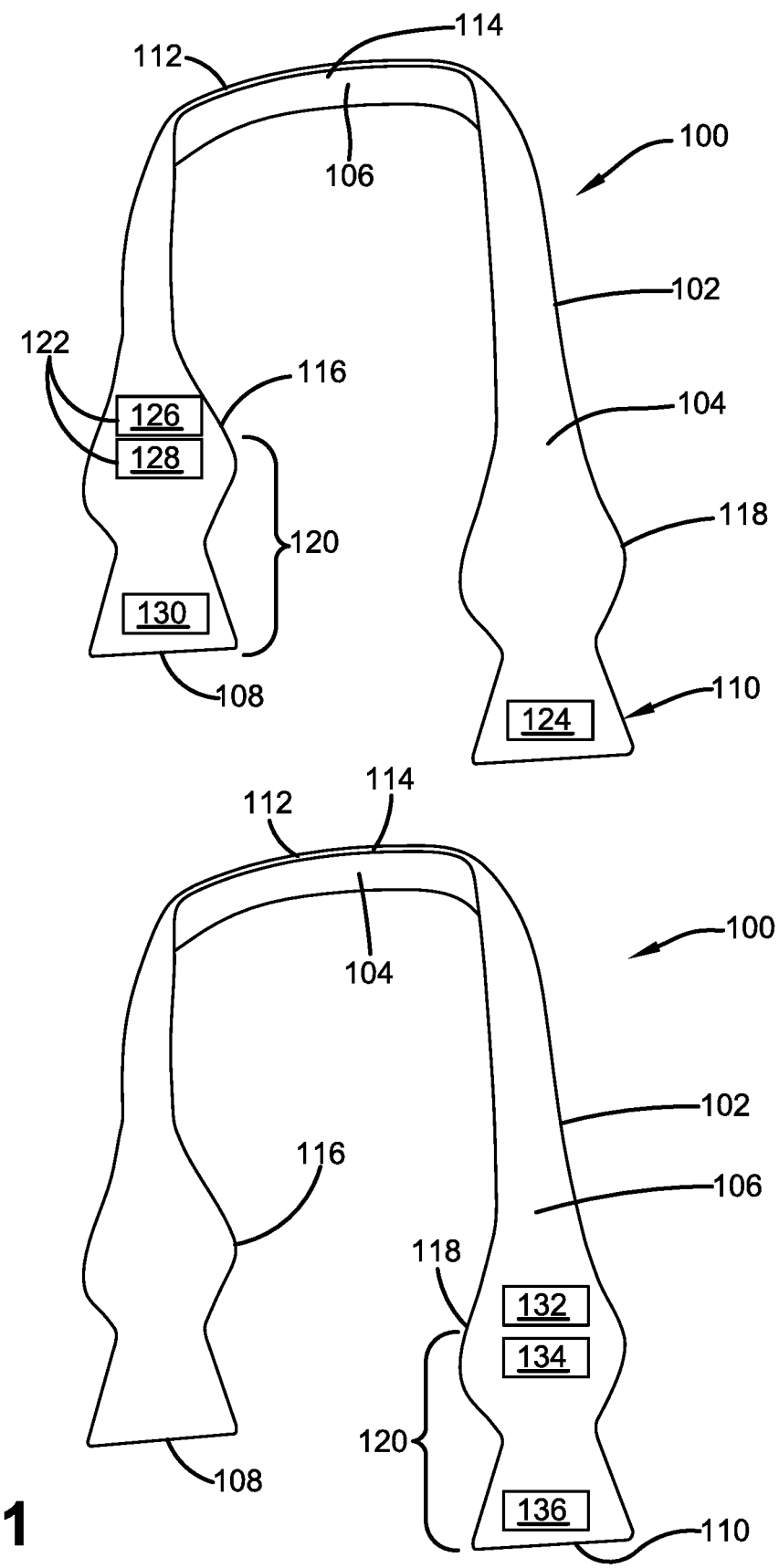
FIG. 1 illustrates an instructional bow tie in accordance with the present disclosure.

The structures shown schematically in the drawings have parts that are examples of the elements recited in the claims. The illustrated structures thus include examples of how a person of ordinary skill in the art might make and use the claimed subject matter. These structures are provided herein to meet the enablement and best mode requirements of the patent statute and are not intended to impose any limitations that are not already recited within the claims.

The present application contemplates bow ties, garments, articles, kits, and methods for teaching a user how to tie a bow tie.

Figure 2:
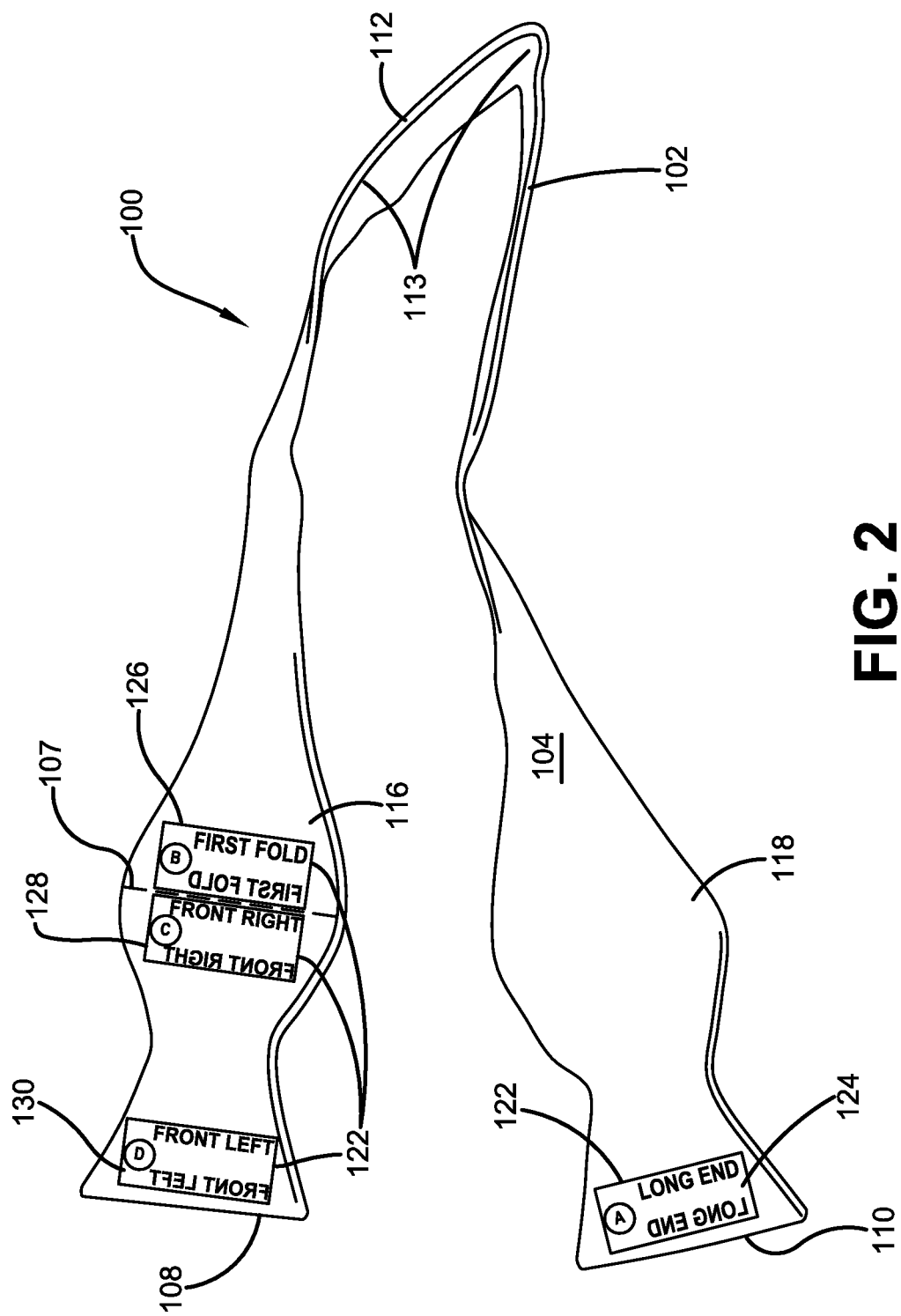
FIG. 2 illustrates a practice bow tie in accordance with the present disclosure.

With reference to FIG. 1 and FIG. 2 and in accordance with one aspect of the disclosure, a practice bow tie 100 is made of a long piece of flexible material 102. The practice bow tie is illustrated in FIG. 1 as it would hang from a person's neck before a person would start tying the bow tie. FIG. 1 illustrates one end that hangs down longer than the other which will be later described in detail.

Figure 9:
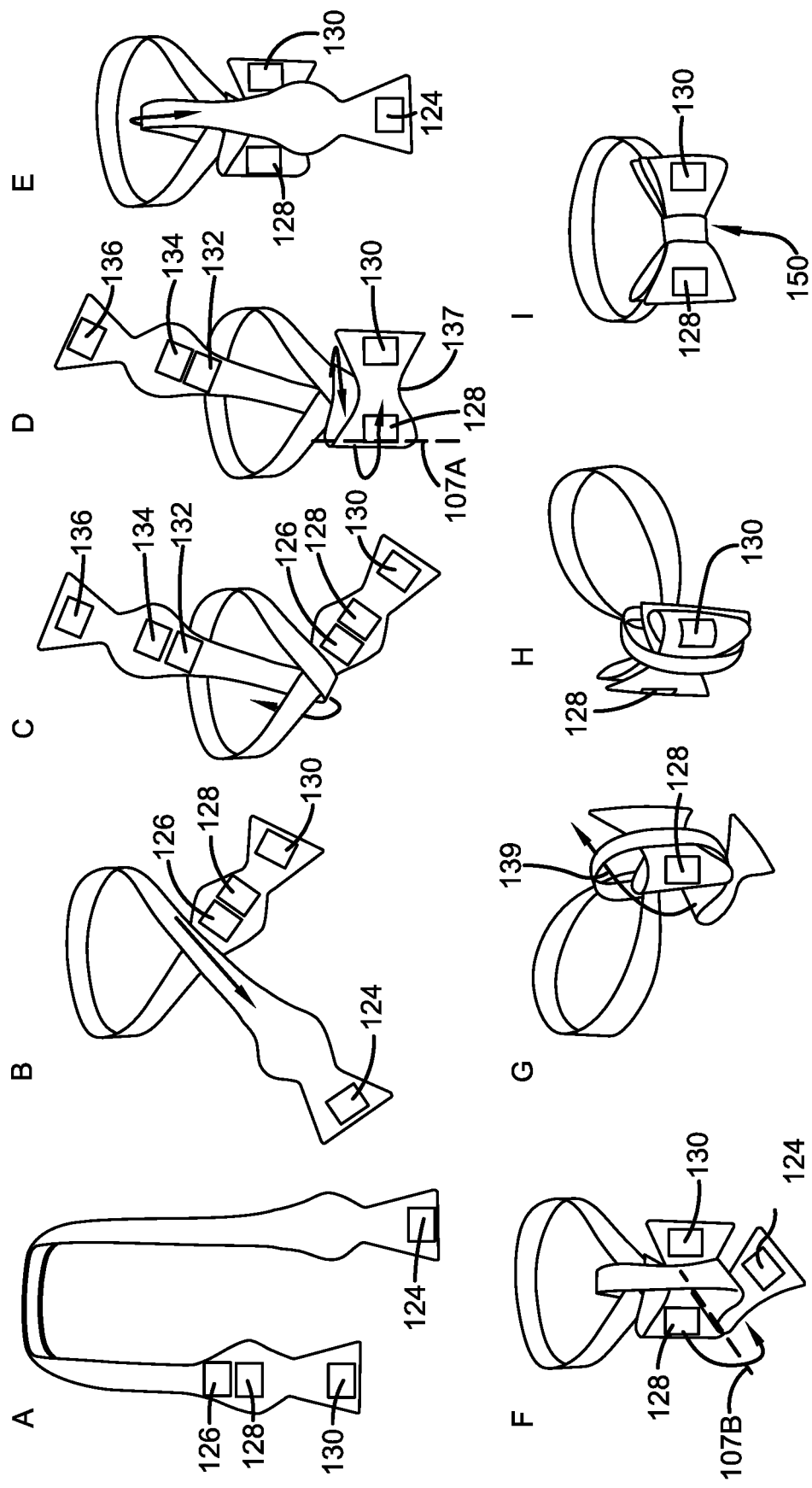
FIG. 9 illustrates a method of tying a bow tie with a practice bow tie in accordance with the present disclosure.

The long piece of flexible material 102 is shaped such that when properly tied, it produces a satisfactory bow tie appearance. A satisfactory bow tie appearance 150 is best illustrated in FIG. 9. The flexible material is typically a fabric but one skilled in the art would realize that any material able to be manipulated and tied into a knot may be suitable for a bow tie.

A practice bow tie 100 includes a front surface 104 and a rear surface 106. The practice bow tie 100 is shaped such that it has a first flared end 108 and a second flared end 110. The bow tie also induces a neck portion 112 that wraps behind a person neck when worn. The neck portion is located about the center 114 of the elongated flexible material.

The practice bow tie also includes a first fold portion 116 and second fold portion 118. The first fold portion 116 is located between the first flared end 108 and neck portion 112. The second fold portion 118 is located between the second flared end 110 and neck portion 112. The first fold portion 116 and second fold portion 118 are sections of the bow tie 100 that bulge laterally and create an hourglass-like FIG. 120 with the flared ends 108 and 110.

The practice bow tie 100 includes a plurality of spaced indicators 122 located on the front surface 104 and rear surface 106. In accordance with one aspect of the disclosure, the indicators 122 are flexible labels that are fixed to the bow tie 100. In accordance with another aspect of the disclosure, the indicators 122 are indicia that are directly attached or printed upon or otherwise located on the surface of the bow tie through any means chosen with sound engineering judgement. Some of those means include screen printing, stamping, embroidery, or physically marking the bow tie with some sort of marker.

With continued reference to FIG. 1, in accordance with one aspect of the disclosure, the plurality of indicators 122 include a long end indicator 124 located on the front surface 104 about the second flared end 110, a first fold indicator 126 located on the front surface 104 in the first fold portion 116, a front right portion indicator 128 located on the front surface 104 in the first fold portion 116 and spaced adjacent to first fold indicator 126, a front left portion indicator 130 located on the front surface 104 and about the first flared end 108, a second fold indicator 132 on the rear surface 106 in the second fold portion 118, a back left portion indicator 134 located in the second fold portion 118 spaced adjacent to second fold indicator 132, and a back right portion indicator 136 on the rear surface 106 about the second flared end 110.

When the bow tie is correctly tied, the front right portion 128 and front left portion 130 will be the outer most facing portions of the bow tie 100. Hidden behind the front right and left portions are the back right portion and back left portion, respectively. This orientation indicates to the person tying the knot that the bow tie 100 has been successfully tied. This also yields a practice bow tie with a satisfactory appearance.

With reference to FIG. 2 and in accordance with one aspect of the disclosure, the practice bow tie 100 includes an additional fold line indicator 107 indicating the desired location for a fold of the fold portions 116 and 118. In accordance with another aspect of the disclosure, the fold line indicator 107 is approximately 3 to 5 inches in from the end of a flared end 108 or 110. In some embodiments, the fold indicator line 107 is printed directly on the bow tie. In some embodiments, the fold line indicator 107 is a line of fabric or thread stitched into the bow tie. In some embodiments, the fold line indicator 107 is a label fixed to the bow tie.

In accordance with another aspect of the disclosure and illustrated in FIG. 2, the practice bow tie 100 includes a length adjustment means 113. The length adjustment means 113 allows the user to adjust the length of the bow tie so that is matches the user's neck size and when tired results in a bow tie with a satisfactory appearance. In some embodiments, and as illustrated, the length adjustment means 113 are adjustable sliders, however it is understood that any adjustment means known in the art for adjusting the bow tie length can be used.

Figure 3:
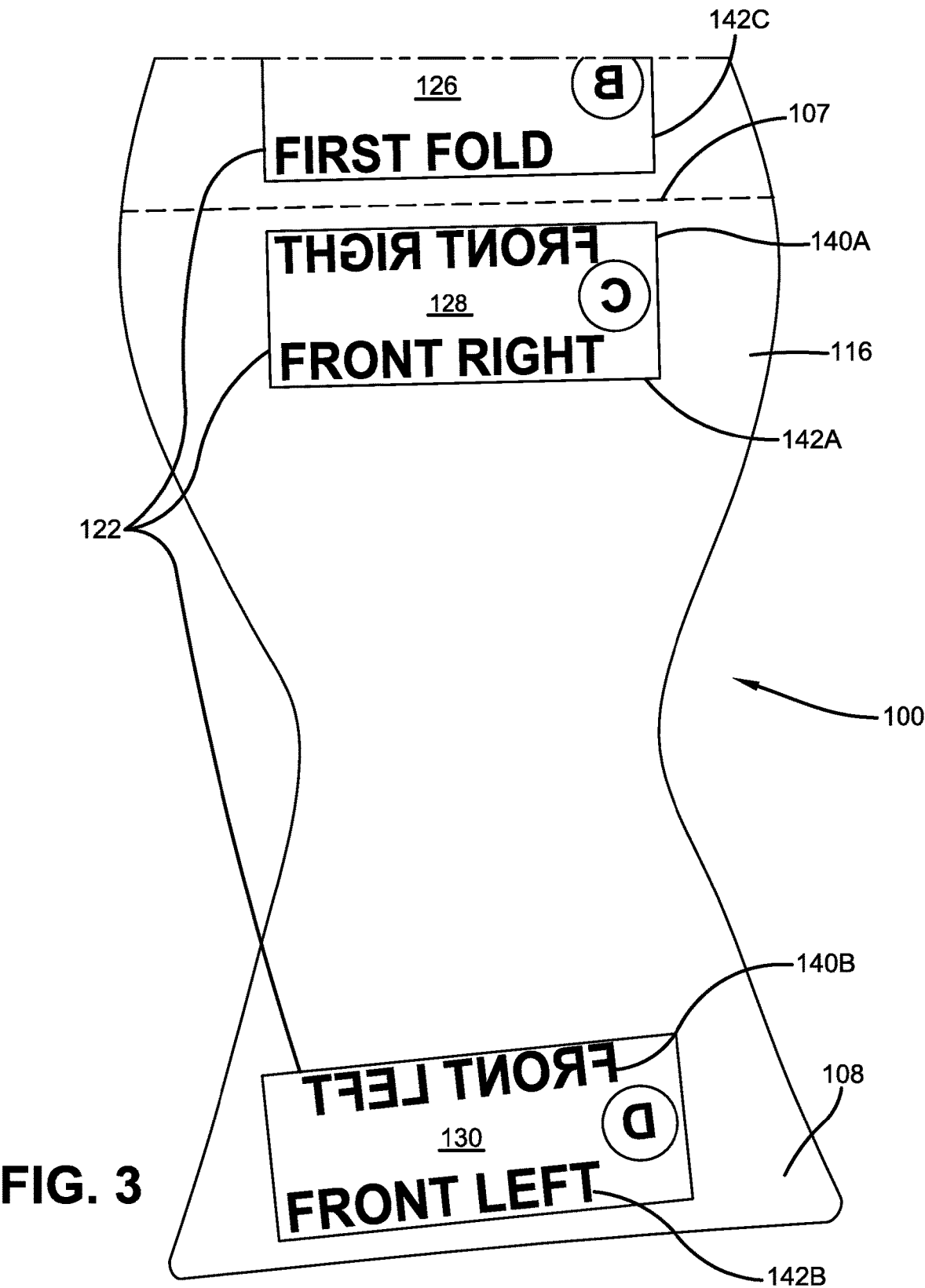
FIG. 3 illustrates a close up a practice bow tie in accordance with the present disclosure.

With reference to FIG. 3 and in accordance with one aspect of the disclosure, the plurality of indicators 122 include a set of words. In some embodiments the set of words are readable by a person tying a bow tie while looking at the bow tie and describe the position or related step for that individual indicator. As illustrated in FIG. 3, the front right indicator 128 includes the words "FRONT RIGHT," 142A, the front left indicator 130 includes the words "FRONT LEFT," 142B, and the first fold indicator 126 includes the words "FIRST FOLD," 142C. The other indicators 122, not pictured, likewise contain words defining either their position or fold location.

In accordance with another aspect of the disclosure and with continued reference to FIG. 3, the plurality of indicators 122 include a set of mirror image words. The set of mirror image words are readable by a person tying a bow tie while looking into a mirror at the bow tie in the mirror. The set of mirror image words describe the position or related step of that individual indicator. As illustrated in FIG. 3, the front right indicator 128 includes the set of mirror image words "FRONT RIGHT," 140A, the front left indicator 130 includes the set of mirror image words "FRONT LEFT," 140B. The other indicators 122, not pictured, likewise include a set mirror image words describing either their position or fold location.

In accordance with another aspect of the disclosure and with continued reference to FIG. 3, the plurality of indicators include both a set of mirror image words readable by a person tying a bow tie while looking into a mirror at the bow tie in the mirror and a set of words are readable by a person tying a bow tie while looking at the bow tie and describe the position or related step for that individual indicator.

Figure 4:
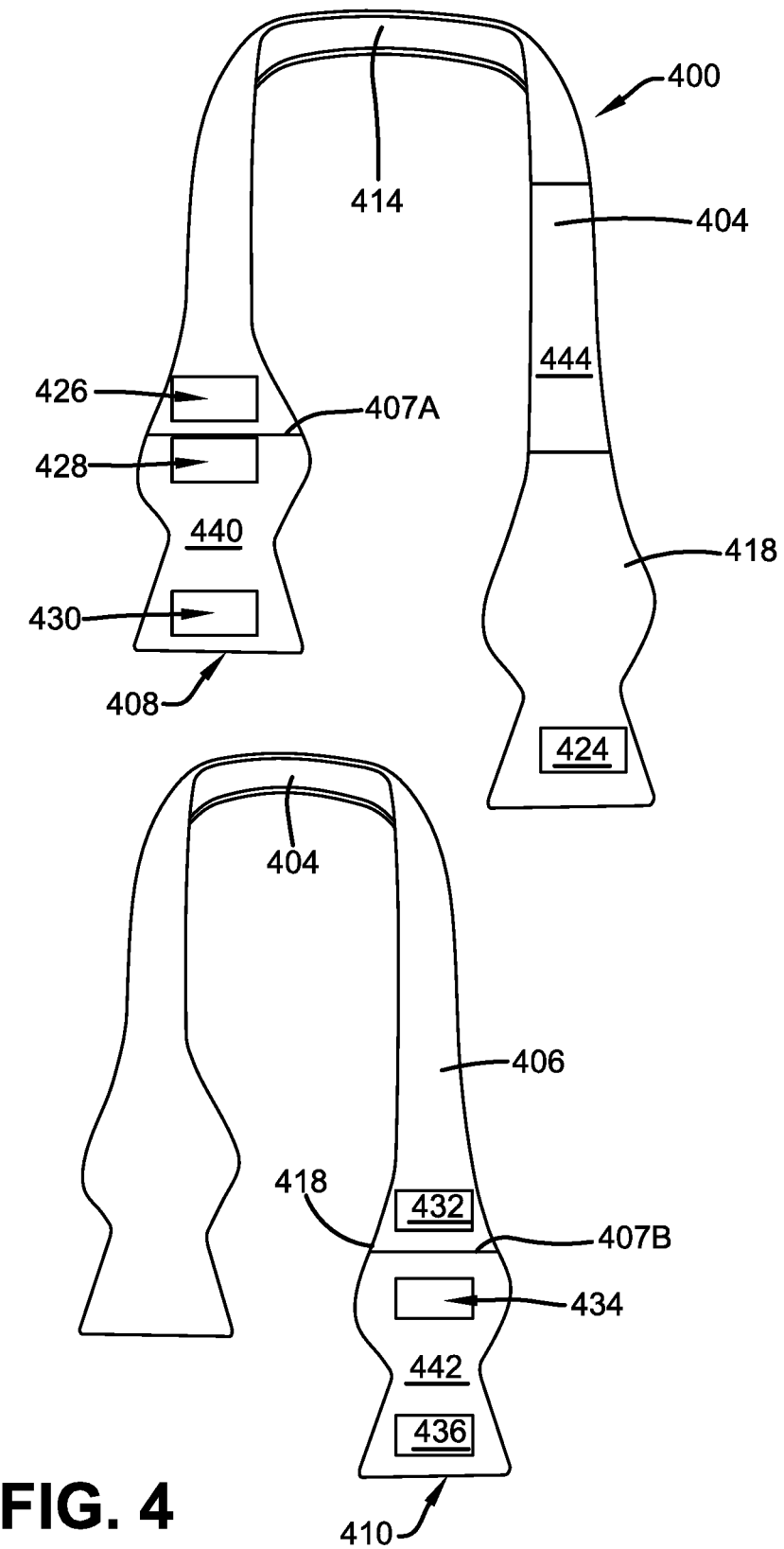
FIG. 4 illustrates a practice bow tie in accordance with the present disclosure.

In accordance with another aspect of the disclosure and with reference to FIG. 4, the practice bow tie 400 includes colored sections such that when the bow tie 400 is properly tied, the bow tie presents the colored sections forward toward an observer. The colored sections are of a different color than the remainder of the tie, the "non-colored portions." The first colored section 440 is a section of the front surface 404 of the bow tie 400 extending from a line 407A between the first fold indicator 426 and right front 428 indicator to the first flared end 406, the second colored section 442 is located on the rear surface 406 of the bow tie 400 extending from a line 407B between the second fold indicator 432 and back left indicator 434 to the second flared end 410, and an intermediate colored section 444 on the front surface 404 of the bow tie 400 between the second folding portion 418 and center of the bow tie 414. Each colored section 400, 442, and 444 are of the same color such that when a user ties the bow tie, the bow tie appears as a uniform color that is the same as the colored sections. In one exemplary embodiment each colored section 400, 442, and 444 are each yellow sections while the remainder of the tie, the non-colored sections, is black or gray in color. Thus, when the practice bow tie is tied, it will appear yellow to all observers. The colored sections provide feedback to the person tying the practice bow tie. If the bow tie is incorrectly tied, then then the practice bow tie will not be uniform in color.

With reference to FIG. 9, (A) a person using the practice bow tie first places bow tie around their neck such that the long end indicator 124 of the bow tie extends downward beyond the front left indicator 130, which is now also the short end of the bow tie. (B) The bow tie's long end, indicated by long end indicator 124, is then crossed over the portion hanging to the left indicated by the front left indicator 130, front right indicator 128 and first fold indicator 126. (C) The long end of the bow tie is curled up and looped around the short end. (D) The short end is then folded at a line 107A between the first fold indicator 126 and front right indicator 128. The folded portion is then rotated into a position that is approximately parallel with the ground creating a first bow tie shape. The long portion is then brought down and wrapped over said center of said first bow tie shape 137. The short end is folded about its center and over the long end such that indicators 128 and 130 are in contact with each other. The long end is folded about a line 107B between the second fold indicator 132 and back left indicator 134. The folded long end portion creates a second bow tie shape 138 which is threaded through the loop 139 created by wrapping the long end down over the first bow tie shape 137. The ends are pulled in order to tighten the knot and appear a satisfactory bow tie appearance 150.

Figure 5:
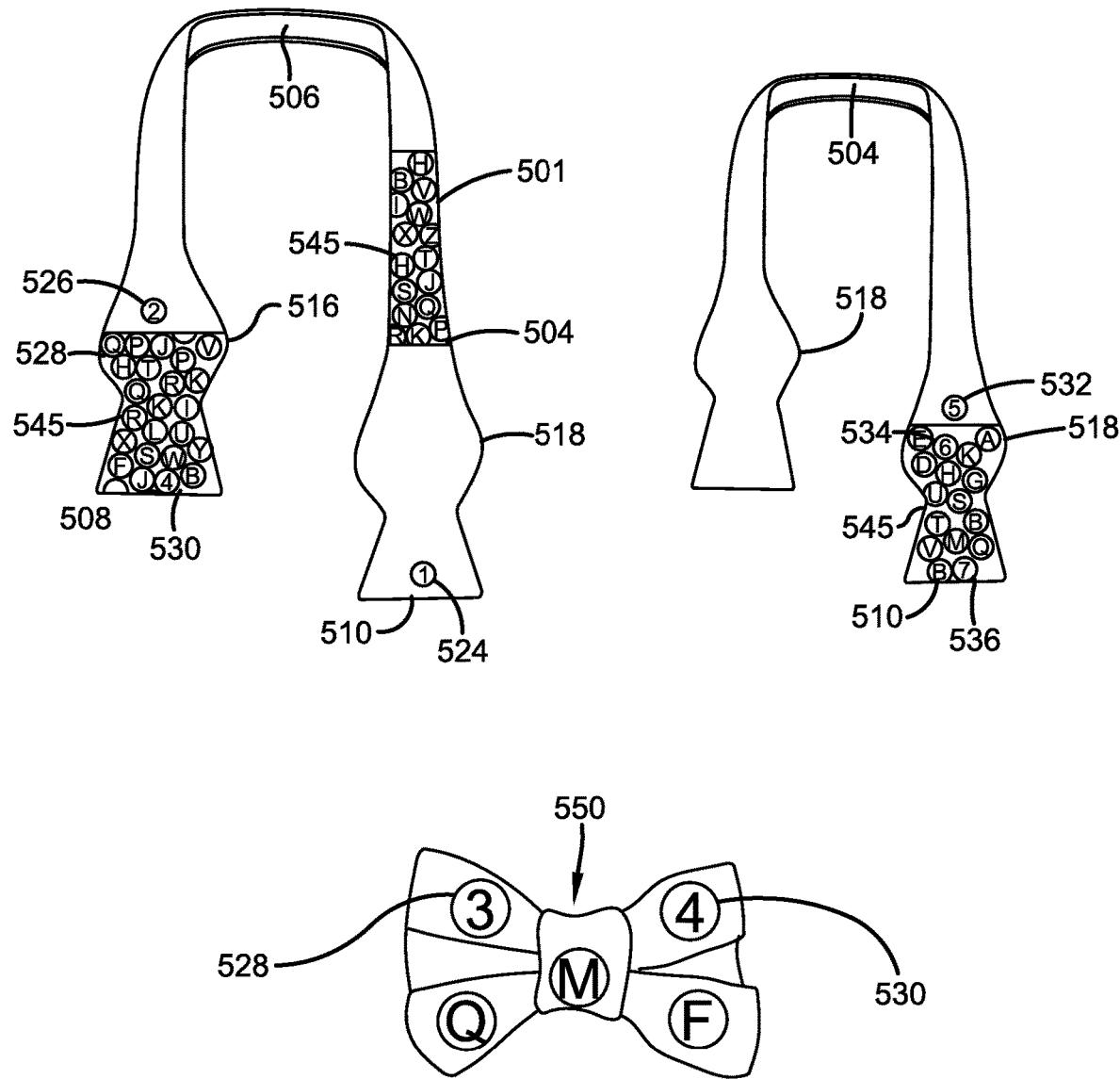
FIG. 5 illustrates a practice bow tie in accordance with the present disclosure.

In accordance with another aspect of the disclosure and with reference to FIG. 5, the indicators are included in the overall design of the practice bow tie 501. This yields a practice bow tie 501 that a user would more likely wear with an outfit. The practice bow tie 501 includes a plurality of design sections 545 such that when the bow tie 501 is properly tied, the bow tie presents the design sections forward toward an observer. The design sections 545 incorporate a plurality of indicators into the design sections of the tie. The plurality of indicators provide guidance to a user tying a practice bow tie but are not obvious to a casual observer of the tied practice bow tie 501.

With continued reference to FIG. 5, the practice bow tie 501 includes a front surface 504 and a rear surface 506. The practice bow tie 500 is shaped such that it has a first flared end 508 and a second flared end 510 and includes a first fold portion 516 and second fold portion 518. The first fold portion 516 and second fold portion 518 are sections of the bow tie 500 that bulge laterally and create an hourglass-like figure with the flared end portions 510 and 508. The practice bow tie 500 includes a plurality of non-obvious spaced indicators 526, 528, 530, 532, 534, and 536, located on the bow tie's front surface 504 and rear surface 506. In accordance with one aspect of the disclosure, the non-obvious indicators are surrounded by dummy indicators. In one exemplary embodiment illustrated in FIG. 5, the dummy indicators are shown as letters while the non-obvious indicators are shown as numbers and cited as elements 526, 528, 530, 532, 534, and 536. However, it is appreciated that these may be reversed or any variation of dummy indicators and non-obvious indicators may be used. In accordance with another aspect of the disclosure, the non-obvious indicators are placed among design elements of the bow tie such that the non-obvious indicators do not stand out or attract unwanted attention by a casual observer looking at the tied practice bow tie.

In accordance with another aspect of the disclosure, the non-obvious indicators are indicia are that among other design elements or dummy indicia are directly attached or printed upon and or otherwise located on the of the bow tie through any means chosen with sound engineering judgement. Some of those means include screen printing, stamping, embroidery, or physically marking the bow tie with some sort of marker.

With continued reference to FIG. 5, in accordance with another aspect of the disclosure, the plurality of non-obvious indicators include a first indicator 524 located on the front surface 504 about the second flared end 510, a second indicator 226 located on the front surface 504 in the first fold portion 516, a third indicator 528 located on the front surface 504 in the first fold portion 516 and spaced adjacent to the second indicator 526, a forth indicator 530 located on the front surface 504 and about the first flared end 508, a fifth indicator 532 on the rear surface 506 in the second fold portion 518, a sixth indicator 534 located in the second fold portion 518 spaced adjacent to fifth indicator 532, and a seventh indicator 536 on the rear surface 506 about the second flared end 510. When the practice bow tie 501 is correctly tied 550, the third 528 and forth indicator 530 will be the outer most facing indicators of the bow tie 501. Hidden behind the front right and left portions are the sixth and seventh indicators, respectively. This orientation indicates to the person tying the bow tie knot that the bow tie 501 has been successfully tied 550. This yields a practice bow tie with a satisfactory appearance wherein the non-obvious indicators 526, 528, 530, 532, 534, and 536 are "hidden" among design elements or dummy indicators. In the exemplary embodiment illustrated in FIG. 5, the practice bow tie 501 appears to be a bow tie with random letters and numbers. However, in reality, the non-obvious indicators/numbers are used by the practice bow tie user to correctly tie the bow tie. The order and location of non-obvious indicators/numbers presented by the tied practice bow tie provide feedback to the user that the bow tie has been correctly tied.

Figure 6:
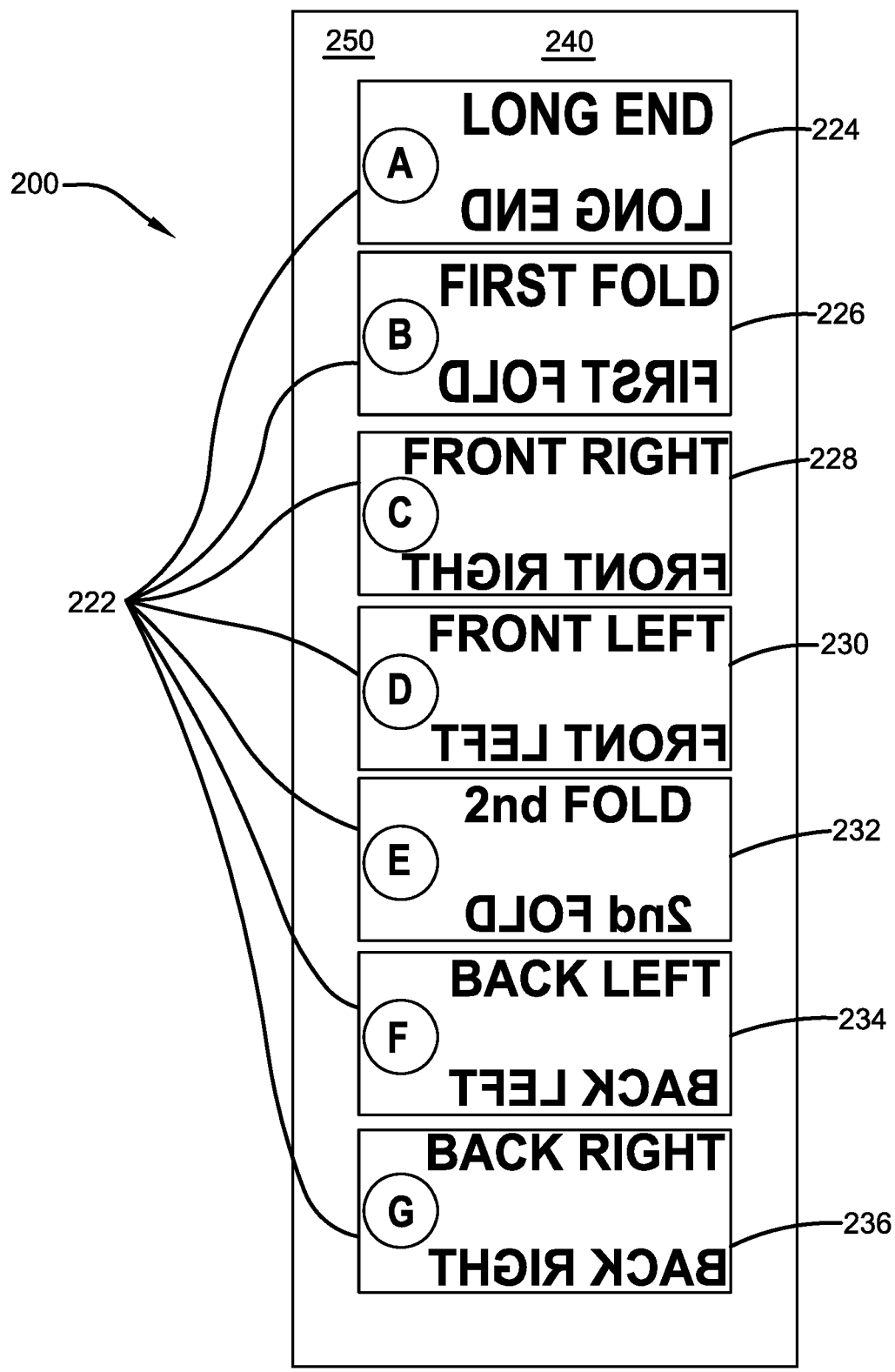
FIG. 6 illustrates an instructional bow tie kit in accordance with the present disclosure.
Figure 7:
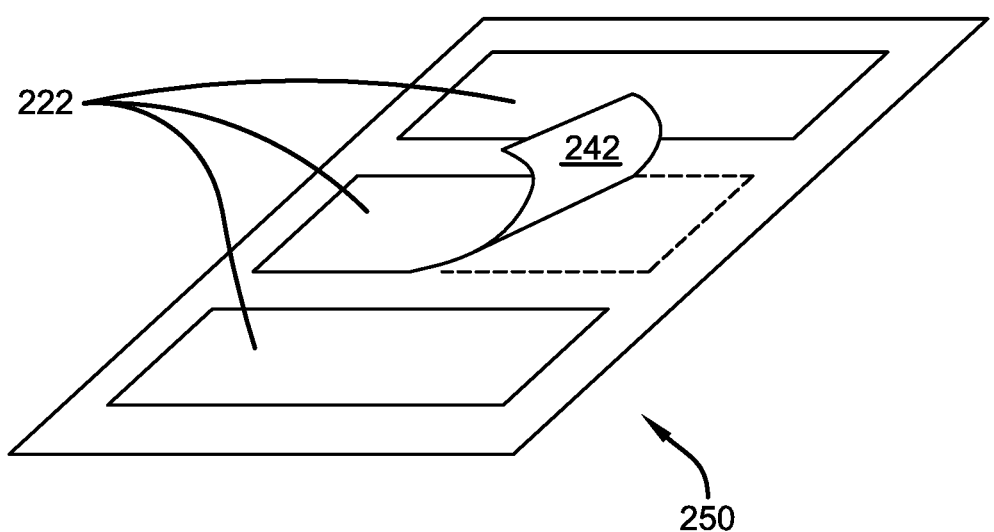
FIG. 7 illustrates a practice bow tie kit in accordance with the present disclosure.

In accordance with another aspect of the disclosure and with reference to FIG. 6 and FIG. 7, a kit is provided to convert any bow tie 201 into a practice bow tie. The kit 200 includes a plurality of indicator labels 222 to be attached on the front surface 204 and the rear surface 206 of any bow tie. Each indicator label 222 includes a front label surface 240 and a rear label surface 242.

With continued reference to FIG. 6 and FIG. 7, in some embodiments, the individual indicators 222 include a long end indicator label 224, a first fold indicator label 226, a front right portion indicator label 228, a front left portion indicator label 230, a second fold indicator label 232, a back left portion indicator label 234, and a back right portion indicator label 236.

In accordance with another aspect of the disclosure, the indicator labels include indicia that are directly attached or printed upon or otherwise located on the surface 240 of the indicator label 222 through any means chosen with sound engineering judgement. Some of those means include screen printing, stamping, embroidery, or physically marking the label with some sort of marker.

Each individual indicator label 222 includes a rear label surface 242. Each rear label surface 242 includes an attachment means. The attachment means allows the indicator label to be attached to any bow tie. In some embodiments, the attachment means creates a permanent attachment between an individual indicator label 222 and a bow tie 201. In other embodiments, the attachment means provides a removable attachment to a bow tie. In the case of the removable attachment, it is desirable that when the indicator label is removed from the bow tie that the bow tie and fabric/material is minimally damaged.

The attachment means can be a thermal attachment means, an adhesive attachment means (including, but not limited to, glues and tapes), and/or a mechanical attachment means. In some embodiments, the attachment means is a pressure sensitive adhesive. In other embodiments the attachment means is a hot melt adhesive that melts with application of an iron to the bow tie. In yet other embodiments the attachment means is a series of hooks as known in hook and loop arrangements. Here, the hooks of the attachment means can grab the "loops," i.e. material/fabric of the bow tie. In some embodiments, the attachment is magnetic.

In accordance with another aspect of the present disclosure, the indicator labels 222 of the kit 200 each include a set of letters and/or words on each front surface 240. In some embodiments, the set of letters and/or words are readable by a person tying a bow tie looking at the bow tie in a mirror. In other embodiments, the set of letters and/or words are readable from the view of a person tying the bow tie looking at the practice bow tie. In yet other embodiments, the front surface of the label includes both a set of letters and/or words readable by a person tying a bow tie looking at the bow tie in a mirror and a set of letters and/or words readable from the view of a person tying the bow tie looking at the bow tie.

In accordance with another aspect of the disclosure and with continued reference to FIG. 6 and FIG. 7, a plurality of indicator labels 222 are provided in sheet 250. Each indicator label 222 is perforated, kiss cut, or included such that it can be separated and removed individually from the sheet 250 and as shown in FIG. 6.

Figure 8:
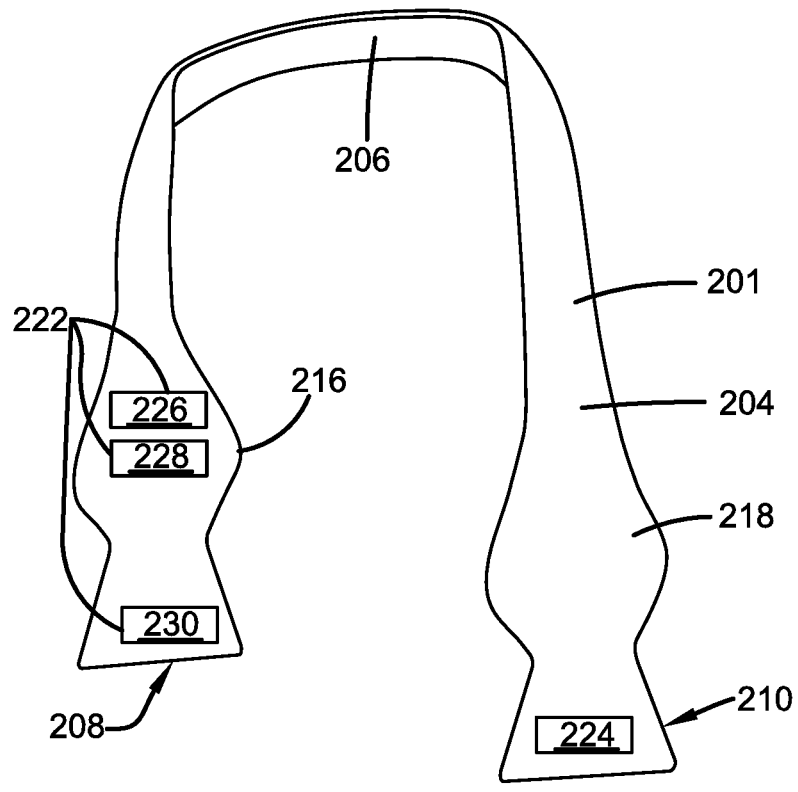
FIG. 8 illustrates a practice bow tie kit in accordance with the present disclosure.
Figure 8:
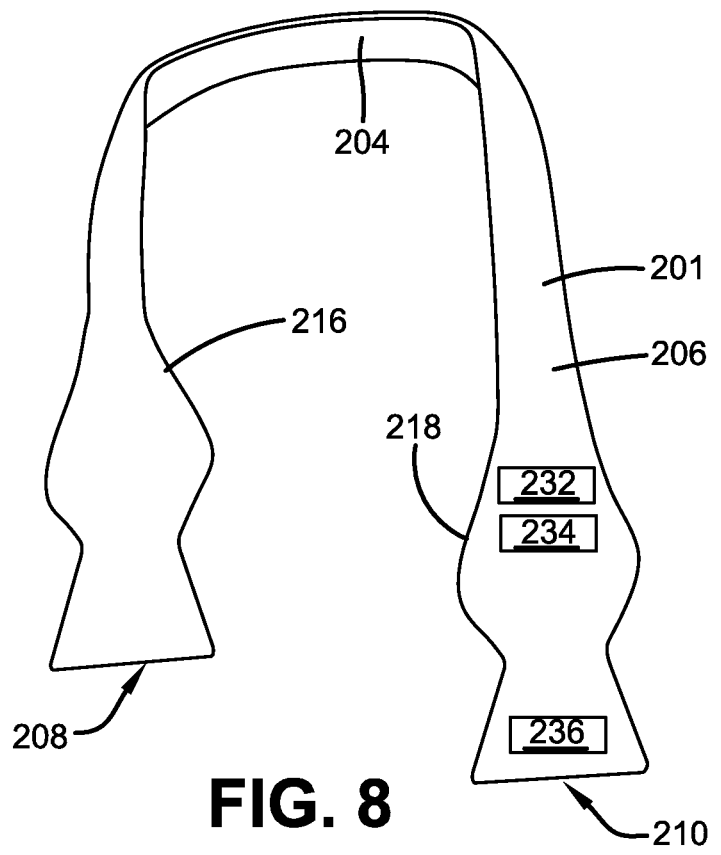

In accordance with another aspect of the disclosure and with reference to FIG. 8, the indicator labels 222 of the instructional bow tie kit 200 are placed on any bow tie 201. The long end indicator label 224 is placed on the front surface 204 of the bow tie 201 about its second flared end 210, the first fold indicator label 226 is placed on the front surface 204 of the bow tie 201 about the first fold portion 216 and beyond about 3 to 5 inches from the first flared end 208, the front right indicator label 228 is placed on the front surface 204 of the bow tie 201 about the first fold portion 216 and less than about 3 to 5 inches from the first flared end 208, the front left portion indicator label 230 is placed on the front surface 204 about the first flared end 208, the second fold indicator label 232 is placed on the rear surface 206 about the second fold portion 218 and beyond about 3 to 5 inches from the second flared end 210, the back left portion indicator label 234 is placed on the rear surface 206 about the second fold portion 218 and less than about 3 to 5 inches from the second flared end 210, the back right portion indicator label 236 is placed on the rear surface 206 about the second flared end 210.

It is appreciated that as the user learns the bow tie tying method, the user can choose to place as many or as little of the indicator labels as he/she feels they need on the bow tie.

In accordance with another aspect of the present disclosure, a method is provided for tying a practice bow tie and bow tie including indicator labels provided from a kit of indicator labels. While the reference numerals of FIG. 9 correspond to the indicator labels and locations of a practice bow tie illustrated in FIG. 1-4, it is understood that the method is amendable to any bow tie with attached indicator labels from a kit also described above. The method includes providing a practice bow tie or bow tie with indicator labels. With reference to FIG. 9, (A) a person using a practice bow tie 100 first places the bow tie around their neck such that the long end indicator 124 extends downward beyond the front left indicator 130, which is now also the short end of the bow tie. (B) The long end, indicated by long end indicator 124, is then crossed over the portion hanging to the left indicated by the front left indicator 130, front right indicator 128 and first fold indicator 126. (C) The long end of the bow tie is curled up and looped around the short end. (D) The short end is then folded at a line 107A between the first fold indicator 126 and front right indicator 128 and rotated into a position creating a first bow tie shape that is approximately parallel with the ground. The long portion is then brought down and wrapped over said center of said first bow tie shape 137. The short end is folded about its center and over the long end such that indicators 128 and 130 are in contact with each other. The long end is folded about a line 107B between the second fold indicator 132 and back left indicator 134. The folded long end portion creates a second bow tie shape 138 which is threaded through the loop 139 created by wrapping the long end down over the first bow tie shape 137. The ends are pulled in order to tighten the knot and appear a satisfactory bow tie appearance 150.

In accordance with another aspect of the present disclosure, the method further includes providing a template or instructions illustrating a desirable placement location for each individual indicator label.

In accordance with another aspect of the present disclosure, the method further includes placing each individual indicator label on said bow tie in said desirable placement location.

I claim:
1. A practice bow tie comprising:
an elongated piece of flexible material comprising:
a front surface and a rear surface;
a first flared end and a second flared end;
a neck portion,
wherein said neck portion is about a center of said elongated piece of flexible material;
a first fold portion and a second fold portion,
wherein said first fold portion is located between said first flared end and said neck portion and said second fold portion is located between said second flared end and said neck portion; and
a plurality of spaced indicators positioned on said front surface and said rear surface.

2. The practice bowtie of claim 1, wherein the plurality of indicators includes, a long end indicator, a first fold indicator, a front right portion indicator, a front left portion indicator, a second fold indicator, a back left portion indicator, and a back right portion indicator; and wherein each portion indicator indicates what portion of the bow tie it is.

3. The practice bow tie of claim 2 wherein said practice bow tie further comprises a first fold indicator line and a second fold indicator line,
wherein said first fold indicator line is located on said front surface of the first fold portion and said second indicator line is located on said rear surface of the second fold portion.

4. The practice bow tie of claim 3 wherein said fold line indicator is 3 to 5 inches in from each end.

5. The practice bow tie of claim 1 wherein the plurality of indicators further comprise a set of words and wherein the words on a portion indicator identify a portion of the bow tie and the words on a fold indicator a fold line of the bow tie.

6. The practice bow tie of claim 5 wherein said set of words comprise a set of words readable in a mirror and a set of words readable from the view of a person reading tying the practice bow tie.

7. The practice bow tie of claim 1 wherein the plurality of spaced indicators are included among other design elements such that the plurality of spaced indicators are not obvious to a casual observer.

8. The practice bow tie of claim 1 wherein said plurality of spaced indicators are printed on the elongated flexible material.

9. The practice bow tie of claim 1 wherein said plurality of spaced indicators are labels that are attached to the piece of flexible material.

10. The practice bow tie of claim 2, wherein said long end indicator is placed on said front surface about said second flared end, said first fold indicator is placed on said front surface about said first fold portion and beyond 3 to 5 inches from said first flared end, said front right indicator is placed on said front surface about said first fold portion and less than 3 to 5 inches from said first flared end, said front left portion indicator is placed on said front surface about said first flared end, said second fold indicator is placed on said rear surface about said second fold portion and beyond 3 to 5 inches from said second flared end, said back left portion indicator is placed on said rear surface about said second fold portion and less than 3 to 5 inches from said second flared end, said back right portion indicator is placed on said rear surface about said second flared end.

11. The practice bow tie of claim 1 further comprising:
a first colored portion located on said front surface of said bow tie extending from a line located between said first fold portion and said neck portion to the first flared end;
a second colored section located on the rear surface of said bow tie extending from a second line located between said second fold portion and said neck portion to said second flared end; and
an intermediate colored section located on the front surface of said bow tie located between said second folding portion and said center of said bow tie,
wherein each colored section is of the same color such that when a user ties said bow tie, said bow tie appears uniform in color.

12. A bow tie practice kit comprising:
a practice bow tie comprising
an elongated piece of flexible material comprising:
a front surface and a rear surface;
a first flared end and a second flared end;
a neck portion,
wherein said neck portion is about a center of said elongated piece of flexible material; and,
a first fold portion and a second fold portion,
wherein said first fold portion is located between said first flared end and said neck portion and said second fold portion is located between said second flared end and said neck portion,
a plurality of indicator labels to be attached on said front surface and said rear surface of the bow tie,
wherein each individual indicator label comprises a front surface and a rear surface,
wherein the plurality of indicator labels includes a long end indicator, a first fold indicator, a front right portion indicator, a front left portion indicator, a second fold indicator, a back left portion indicator, and a back right portion indicator; and
wherein each individual indicator label rear surface comprises an attachment means.

13. The bow tie practice kit of claim 12 wherein the attachment means creates a permanent attachment between an individual indicator label and a bow tie.

14. The bow tie practice kit of claim 12 wherein the attachment means provides a removable attachment to a bow tie.

15. The bow tie practice kit of claim 12 wherein the attachment means is a pressure sensitive adhesive.

16. The bow tie practice kit of claim 12 wherein each individual indicator label front surface comprises a set of words readable in a mirror and a set of words readable from the view of a person reading tying the practice bow tie.

17. The bow tie practice kit of claim 12 wherein said long end indicator is placed on said front surface about said second flared end, said first fold indicator is placed on said front surface about said first fold portion and beyond 3 to 5 inches from said first flared end, said front right indicator is placed on said front surface about said first fold portion and less than 3 to 5 inches from said first flared end, said front left portion indicator is placed on said front surface about said first flared end, said second fold indicator is placed on said rear surface about said second fold portion and beyond 3 to 5 inches from said second flared end, said back left portion indicator is placed on said rear surface about said second fold portion and less than 3 to 5 inches from said second flared end, said back right portion indicator is placed on said rear surface about said second flared end.

18. A method of tying a bow tie comprising the steps of providing:
a bow tie comprising:
a front surface and a rear surface;
a first flared end and a second flared end;
a neck portion,
wherein said neck portion is about the center of said elongated piece of flexible material;
a first fold portion and a second fold portion,
wherein said first fold portion is located between said first flared end and said neck portion and said second fold portion is located between said second flared end and said neck portion; and
a plurality of spaced indicators positioned on said front surface and said rear surface, wherein the plurality includes, a long end indicator, a first fold indicator, a front right portion indicator, a front left portion indicator, a second fold indicator, a back left portion indicator, and a back right portion indicator;

wherein said long end indicator is placed on said front surface about said second flared end, said first fold indicator is placed on said front surface about said first fold portion and beyond 3 to 5 inches from said first flared end, said front right indicator is placed on said front surface about said first fold portion and less than 3 to 5 inches from said first flared end, said front left portion indicator is placed on said front surface about said first flared end, said second fold indicator is placed on said rear surface about said second fold portion and beyond 3 to 5 inches from said second flared end, said back left portion indicator is placed on said rear surface about said second fold portion and less than 3 to 5 inches from said second flared end, said back right portion indicator is placed on said rear surface about said second flared end, placing said bow tie around a person's neck such that said flared long end indicator extends downward beyond said second flared end which is also a short end, crossing said bow tie long end over said short end;

folding said first fold portion about a location between said first fold indicator and said front right indicator, a location 3 to 5 inches from said first flared end;

rotating said first fold portion and said first flared end sideways presenting a general shape of a bow tie creating a first bow tie shape comprising a center portion;

wrapping said long end down over said center of said first bow tie shape, folding said first bow tie shape about said center;

folding said second fold portion about a location between said second fold indicator and said back left indicator, a location 3 to 5 inches from said second flared end creating a second bow tie shape;

threading said second bow tie shape through a loop created by wrapping said long end down over said center of said first shaped bow tie.

19. The method of claim 18 further comprising:

providing a template illustrating a desirable placement location for each individual indicator label.

20. The method of claim 18 further comprising: placing each individual indicator on said bow tie in said desirable placement location.

\* \* \* \* \*